Jan. 2, 1951            M. M. BLANK            2,536,589
CYLINDER CLEANER AND WIRE STRAIGHTENER
Filed Dec. 29, 1945            4 Sheets—Sheet 1
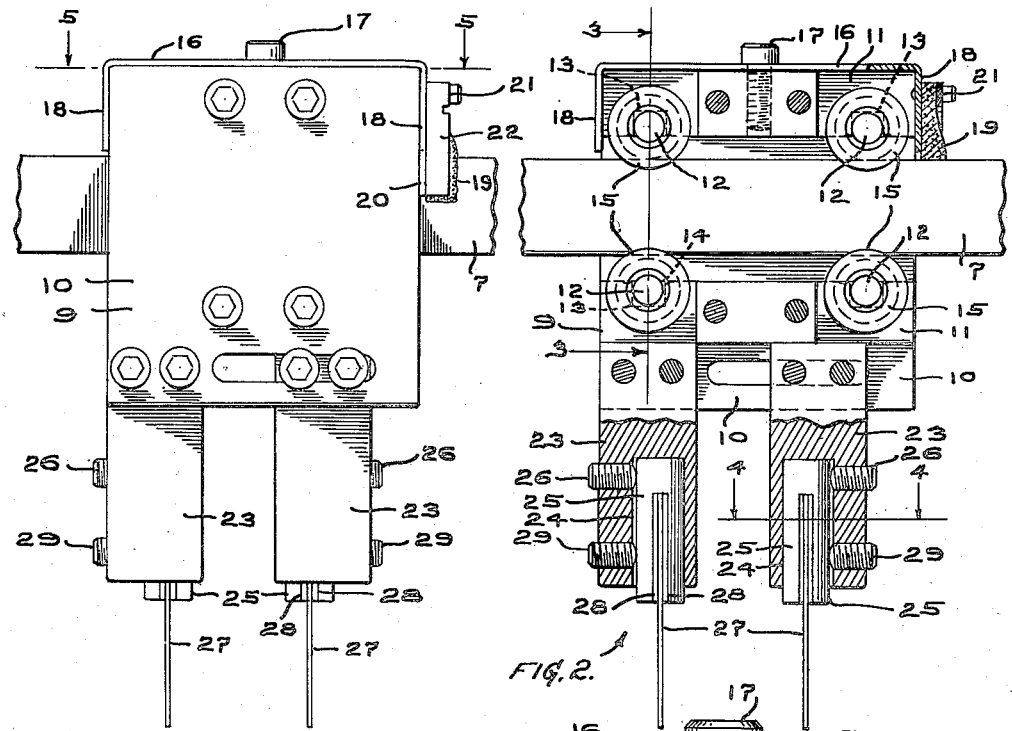
FIG. 1.
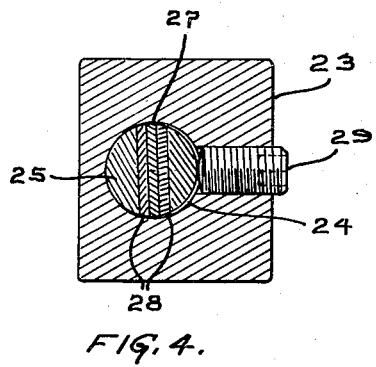
FIG. 4.
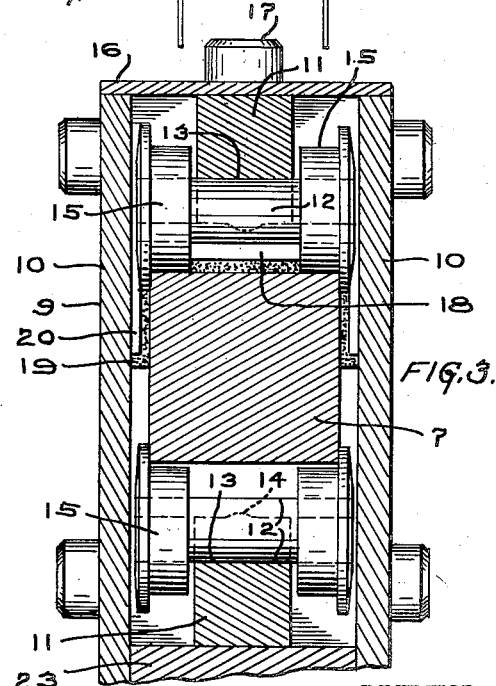
INVENTOR.
Malcolm M. Blank
BY Thomas W. J. Clark
Attorney Jan. 2, 1951    M. M. BLANK    2,536,589
CYLINDER CLEANER AND WIRE STRAIGHTENER
Filed Dec. 29, 1945    4 Sheets-Sheet 2
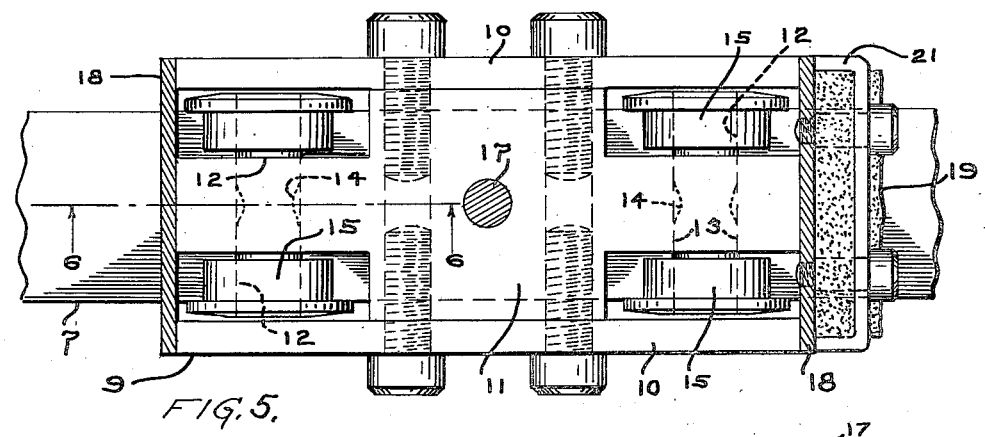
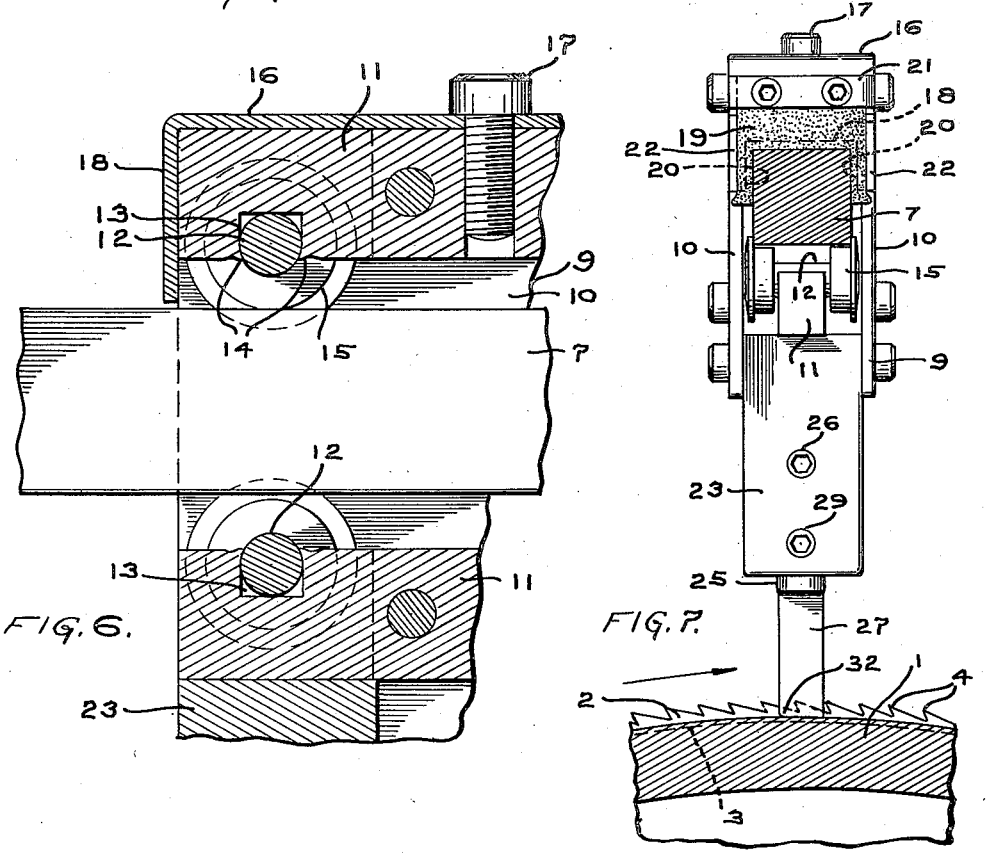
INVENTOR.
Malcolm M. Blank
BY Thomas W. J. Clark
Attorney Jan. 2, 1951        M. M. BLANK        2,536,589
CYLINDER CLEANER AND WIRE STRAIGHTENER Filed Dec. 29, 1945        4 Sheets-Sheet 3

INVENTOR.
Malcolm M. Blank.
BY Thomas W. J. Clark
Attorney

Jan. 2, 1951 M. M. BLANK 2,536,589
CYLINDER CLEANER AND WIRE STRAIGHTENER
Filed Dec. 29, 1945 4 Sheets-Sheet 4
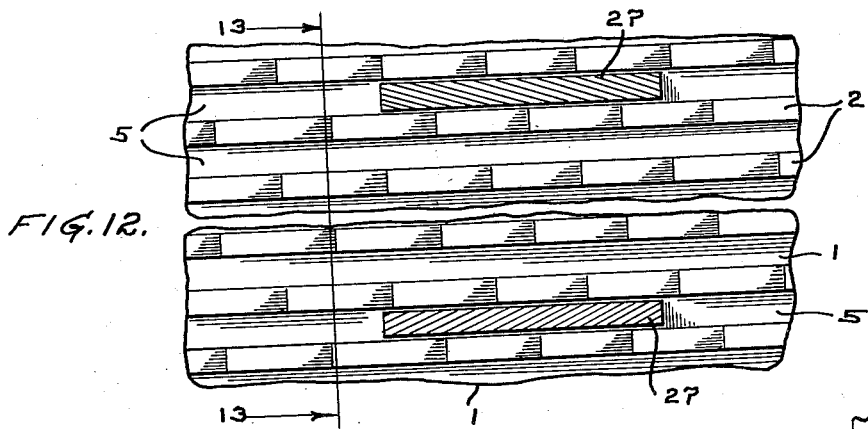
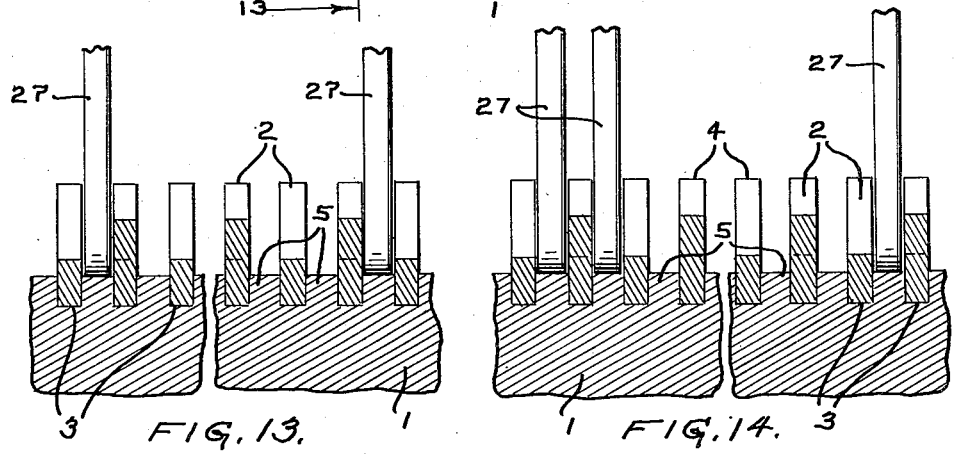
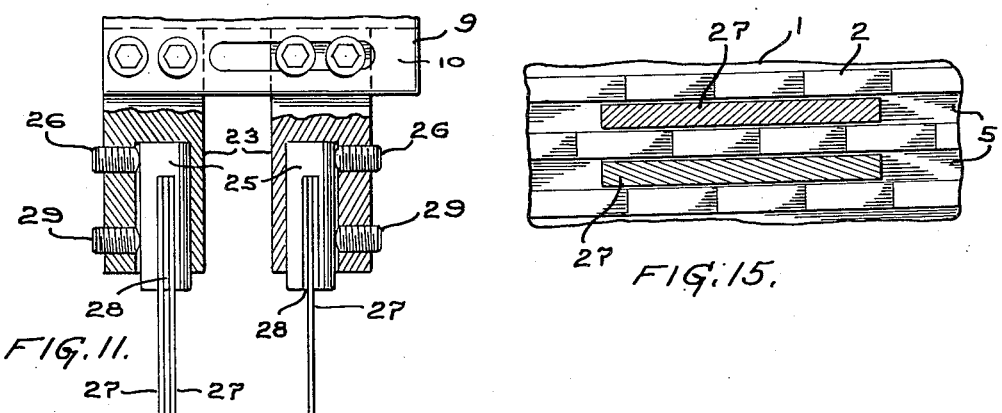
INVENTOR.
Malcolm M. Blank
BY Thomas W. J. Clark
Attorney Patented Jan. 2, 1951

2,536,589

UNITED STATES PATENT OFFICE 2,536,589

CYLINDER CLEANER AND WIRE STRAIGHTENER

Malcolm M. Blank, Baltimore, Md.

Application December 29, 1945, Serial No. 638,135

5 Claims. (Cl. 19—108)

This invention relates to a cleaner and straightener for the wires of metallic clothed cylinders of Garnett and carding machines.

In the use of these machines the saw tooth wires tend to become clogged with burrs, pieces of the material worked upon, and foreign material that has gotten in the product. The clogging sometimes goes so far as to substantially fill the space between the turns of the wire and it renders the cylinders so affected substantially inoperative.

Current practice heretofore has been to stop the machine from its normal operation and then for an operator to get into a firm position before each roll so clogged with a hand tool and then he speeds up the machine and holding the hand tool in the space between the wires he cleans the material from the wires, sometimes the rolls going so fast that sparks fly and sometimes the wires are broken by the tool and tend to unwind from the roll and cause damage, and sometimes serious injury to the operator. These disadvantageous results could be somewhat avoided by running the cylinder more slowly but then the cleaning operation would take such a long period of time. This operation is sufficiently difficult on the exposed rolls but when it must be carried out on the rolls within the machine and the operator must get down under the machine in an awkward position with other parts of the machine being in the way and then carry out this cleaning operation with the hand tool the hazard to him and the danger of accidents to the machine is greatly increased. It is of course apparent that each roll as cleaned must be revolved in a direction with the saw teeth pointing away from the tool.

Although various tools have been suggested for cleaning the machine by brushes and mechanically held cleaning tools none of them have yet proved satisfactory, the brushes do not enter the spaces between the wires with sufficient depth to remove all the foreign material and the mechanically held tools are not sufficiently flexibly adjustable to the varying leads of the wire upon the rolls.

The tool of this invention is designed for use particularly on a roll in which the wire is wound upon the roll in the form of a helix and the tool is moved across the roll by the pull of the helix itself so that there is no question of a difference in the feed of the tool coinciding with the lead of the helix. The tool is designed to bear lightly upon the ridge extending between the wire turns on the roll and it consequently clears all foreign matter in this space and which may be upon the teeth of either adjacent turn of the wire.

The tool is also designed to carry two such blades spaced the distance of the thickness of the wire so that when they ride astride the wire they will straighten the teeth of the wire and so not only keep the wire clean but at all times straight and in most effective operating condition.

The cleaner of this invention may be used on the doffer rolls while the machine is in operation carding or garnetting the material and a few passes of the tool across the roll each day maintains the wires in perfect condition. When the tool is to be used on rolls which operate with the saw teeth moving forward, the machine can not be used in its production while cleaning such rolls but those rolls must either be reversed on the machine and cleaned or removed from the machine and put on a rest on which they may be rotated and cleaned and straightened.

Other objects and advantages of the invention will be apparent from the following description and the accompanying drawings forming a part hereof and in which:

Figure 1 is a side elevation of one form of the cleaning tool and its supports.

Figure 2 is a similar partial sectional view thereof.

Figure 3 is substantially a transverse sectional view thereof on line 3—3 of Figure 2.

Figure 4 is a sectional view of one of the tool shanks on line 4—4 of Figure 2.

Figure 5 is a top plan view, partly in section on line 5—5 of Figure 1.

Figure 6 is a partial sectional view on line 6—6 of Figure 5.

Figure 7 is an end elevational view from the right in Figure 1 showing the tool in cleaning relation to a cylinder.

Figure 11 is a fragmentary sectional view showing straightening tools in one shank.

Figure 12 is a fragmentary plan view of a clothed cylinder showing two cleaning tools in section in operation.

Figure 13 is a sectional view on line 13—13 of Figure 12.

Figure 14 is a sectional view of the cylinder showing the tools of Figure 11 in operation.

Figure 15 is a fragmentary plan view of the cylinder showing the straightening tools in operation.

In the figures similar numerals refer to similar parts throughout the several views.

Figure 8:
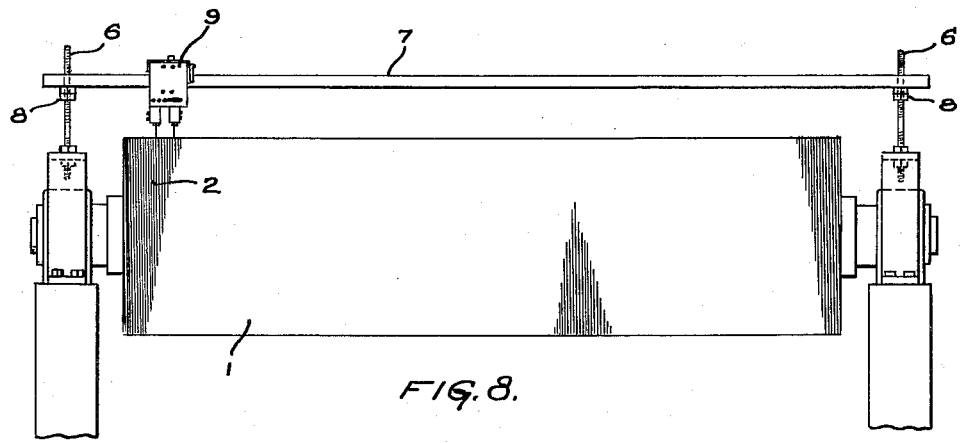
Figure 8 is a side elevation of a doffer roll or cylinder with the cleaning tool in operating position.

The doffer roll of a Garnett or a carding machine has the wire 2 set in grooves 3 in the surface of the roll. These wires have saw teeth 4 projecting outwardly therefrom. The grooves 3 do not rigidly hold the wires but rather the wire is wound around the cylinder in the groove and then the cylinder at the end of the wire and at some intermediate points is swaged, caulked or hammered to firmly hold the wire in the groove. The wire is usually wound while under tension. The wire at any other place than this position of pinch is subject to a slight sidewise movement in the groove 3 and should the wire be broken intermediate the swaged cylinder positions, when the cylinder is rotating, at least one of the broken ends of the wire will tend to unwind very rapidly and dangerously both for the machine and the operator. The grooves 3 are placed quite close together in the form of a screw thread around the cylinder so that when the wire is placed therein it forms a helix resting in the grooves and projecting upwardly from the cylinder with the cylinder surface forming forming a ridge 5 between the turns of the wire. The cylinder bearing supports have uprights or screws 6 in the form of a screw and a rod 7 having holes in its ends is placed over these uprights. The desired height of the rod 7 which extends parallel with the axis of the cylinder can be regulated by the nuts 8 on the uprights 6, preferably the rod 7 is not held down from above so that it has free play. Across the rod 7 a tool holder 9 is adapted to move. The rod 7 is preferably square and the mounting of the tool holder 9 on the rod is so formed as to prevent rotation of the holder upon the rod but at the same time to allow the easiest possible longitudinal movement of the holder across the rod.

The tool holder 9 is made up of side plates 10 screwed to the center of blocks 11. In the upper and lower parts of these blocks and relatively loosely held in them are axles 12. These axles rest in grooves 13 cut in the ends of adjacent faces of the blocks 11 and the open edges of these grooves are slightly hammered in, as at 14, upon the center of the axles to loosely hold the axles from falling from the grooves but at the same time allowing a measure of freedom of movement of the axles in the grooves. On each end of the axles and spaced between the blocks 11, as they are cut away at the ends, and the side plates 10, are the flanged rollers 15, as most clearly shown in Figure 5. These flanged rollers 15 bear on the top and bottom of the rod 7 in the movement of the holder 9 across the rod and prevent rotary movement of the holder on the rod, and rocking movement lengthwise of the rod. The rollers 15 are so held and positioned as to allow a measure of free play of the holder on the rod.

The holder has a top 16 bolted thereto by bolt 17 and this top has extending ends 18 coming down to near the rod 7. The leading end of the cover plate is forked at 20, see Figure 7. A wiper 19 of felt is held fast on this leading or forward end 18 of the cover 16 by a clamping member 21 screwed to the cover plate end, and the clamp has downwardly extending fingers 22 on each side of the clamping member to hold the felt loosely upon the sides of the rod 7. The wiper rests on fingers 20 in its forward movement. The wiper contacts the rod 7 loosely and only with sufficient force to wipe off any foreign material that may rest thereon and prevent the entrance of that material into the holder which might hinder the movement of the holder upon the rod because of the sensitiveness of the movement of the holder upon the rod.

The holder has screwed in its lower part shanks 23 having sockets 24 therein. Tool clamps 25 are held in these sockets by set screws 26 and these clamps are cut out for part of their length to leave a space for the tools 27 and such spacers 28 as may be desired. In Figures 1 and 2, two shanks 23 each holding one tool 27 are shown. In Figure 11 one shank holding one tool and another shank holding two tools 27 are shown. When two tools are so placed in one shank they are separated by a spacer 28 which is substantially the width of the wire. The tools and spacers are held in the shanks by set screws 29.

Figure 9:
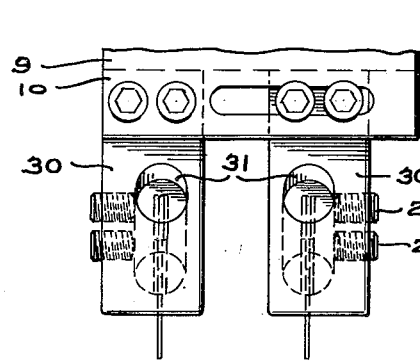
Figure 9 is a fragmentary elevational view of the tool holder with the tools in a modified position.
Figure 10:
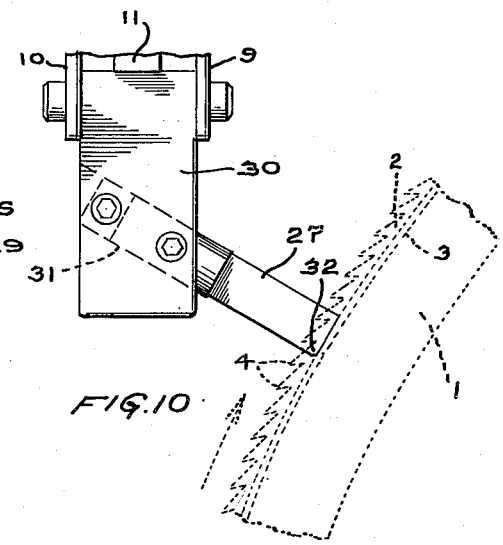
Figure 10 is a side elevational view of the holder of Figure 9 showing the cylinder in dotted lines.

In Figures 9 and 10 shanks 30 are shown with the sockets 31 sloped therein at an angle so that the tool clamps and tools are at an angle extending obtusely downwardly from the holder 9.

The tool in the holder as shown in Figures 1, 2, 7 and 8 contacts the roll or cylinder near the top, preferably a little to the rear of a radius of the roll and substantially parallel to a radius. This form is particularly adapted to use on the upper outer doffer roll of a Garnett machine.

In the form shown in Figures 9 and 10 the tool is also substantially parallel and slightly back of a radius of the roll but it is placed below the top of the roll to be out of the way of other parts of the machine.

The rolls in these machines are heavy and of rather large diameter. In their rotation they are subject to vibration. The lead of the wire is the only force tending to move the tool across its rod 7. The loose movement of the holder on the rod allows the holder itself to vibrate and this slight vibration aids in moving the holder longitudinally of the rod following the slight pushing effort of the wire upon the tool. The tool rests by gravity when it is projecting downwardly upon the ridge of the cylinder between the turns of the wire. It extends below the teeth and it is guided longitudinally by the base of the wire as clearly shown in Figures 7 and 10 as well as Figures 13 and 14. The tools are blunt ended and rectangular in cross section and have only the smallest portion 32 ground off at the leading end so as not to dig into the cylinder ridges. When one tool is used between two turns of the wire all foreign matter is removed from the surface of the ridge and from the wire turns. Some straightening of the teeth is effected also by the use of one tool between two turns of the wire. But because the wires are not always rigidly held in the grooves in the cylinders, the wires tend to give sidewise under the pressure of the tool instead of being straightened upon passing the tool. In order to straighten wires which may be loosely held in the grooves in the cylinders two tools are placed in a single clamp and spaced substantially the width of the wire and when two tools are so used the wire can not rock sidewise and the teeth must therefore be straightened. The tools are themselves slightly less in thickness than the distance between the wires but because they extend below the teeth and really ride at their sides almost upon the base of the wire, even one tool has some straightening effect and of course one has a complete cleaning effect.

The tool clamp when once set at the proper angle in the shank by the set screw 26 to fit the lead of the wire on the cylinder need not be changed when tools are changed or removed from the clamps. These changes can be made by loosening the lower set screws 29 which hold the tools in the clamp.

The tools as described are used on the two forward doffers of a machine and tools of like construction may be placed on the inside doffers of a machine and these tools can operate while the machine is in production of its product. The tool works its own way across the surface of the cylinder and when it has arrived at the other end the rod 7 may be raised by hand upon the uprights 6 and the tool moved back to the other end of the cylinder. If the process of cleaning and straightening the wires of the cylinders is carried on four or five times a day these cylinders are kept clean and the wires straight and the machine need not be stopped and production stopped and the operator need not hazard his own safety to effect this cleaning. Formerly when these cylinders were cleaned the machines had to be shut down sometimes for a full day to effect their cleaning.

Since the doffer rolls are kept completely cleaned by the cleaner of this invention the other rolls tend themselves to remain clean and to be cleaned by the clean doffer rolls. Should they, however, become filled the machine could be reversed and similar cleaning tools used or the rolls could be removed from the machine and similar tools used on a stand for cleaning and straightening the wires.

It will be apparent that many modifications may be made in the structure above described without departing from the invention.

What is claimed as new and is desired to be secured by Letters Patent is:

1. A cleaner for metallic clothed cylinders on which the wire is wound in a helix, comprising a rod parallel with the cylinder, a tool holder non-rotatably and slidably mounted thereon having a cleaning tool therein projecting downwardly therefrom and radially of and towards the cylinder and being adapted to ride between adjacent turns of the wire on the cylinder and to be traversed lengthwise of the cylinder by the helical formation of the wire on the cylinder upon the rotation of the cylinder and supports for said rod which prevent the lowering thereof, but allow the rod to be raised by the tool.

2. A cleaner for metallic clothed cylinders, on which the wire is wound in a helix, comprising a rod parallel with the cylinder, a tool holder non-rotatably and longitudinally movably mounted thereon, rollers in said holder riding on said rod to present a loose rolling contact of said holder to said rod, said holder having a cleaning tool therein with parallel sides and broad end, the tool projecting radially toward the cylinder and adapted to ride between adjacent turns of the wire on the cylinder and to be traversed lengthwise of the cylinder by the helical formation of the wire on the cylinder upon the rotation of the cylinder, the loose rolling contact of the holder permitting vibration of the holder by the cylinder.

3. A cleaner for metallic clothed cylinders, on which the wire is wound in a helix, comprising a rod parallel with the cylinder, a tool holder non-rotatably and longitudinally movably mounted thereon, rollers in said holder, on opposed sides of said rod, to limit the contact of said holder with said rod to a rolling contact, said holder having a cleaning tool therein adapted to ride between adjacent turns of the wire on the cylinder and to be traversed lengthwise of the cylinder by the helical formation of the wire on the cylinder upon the rotation of the cylinder.

4. A cleaner for metallic clothed cylinders on which the wire is wound in a helix, comprising a rod of angular cross-section parallel with the cylinder, a tool holder longitudinally loosely movable on said rod having rollers therein fitting the angular configuration of said rod and preventing rotation of said holder on said rod and limiting the contact of said holder to said rod to a rolling contact, said holder having a cleaning tool therein with parallel sides and broad end, the tool projecting radially toward the cylinder and adapted to ride between adjacent turns of the wire on the cylinder and to be traversed lengthwise of the cylinder by the helical formation of the wire on the cylinder upon the rotation of the cylinder, the loose mounting of the holder on the rod permitting vibration of the holder by the cylinder.

5. A cleaner for metallic clothed cylinders, on which the wire is wound in a helix, comprising a rod parallel with the cylinder, a tool holder non-rotatably and longitudinally movably mounted thereon, rollers in said holder riding on said rod to present a rolling contact of said holder to said rod, a cover over said holder and a wiper thereon for said rod to keep foreign material from the rollers, said holder having a cleaning tool therein adapted to ride between adjacent turns of the wire on the cylinder and to be traversed lengthwise of the cylinder by the helical formation of the wire on the cylinder upon the rotation of the cylinder.

MALCOLM M. BLANK.

REFERENCES CITED

The following references are of record in the file of this patent:

UNITED STATES PATENTS

| Number | Name | Date |
|---|---|---|
| 619,842 | Roberts | Feb. 21, 1899 |
| 1,328,212 | Stanifer | Jan. 13, 1920 |
| 1,743,069 | Walsh | Jan. 7, 1930 |
| 1,913,016 | Walsh | June 6, 1933 |

FOREIGN PATENTS

| Number | Country | Date |
|---|---|---|
| 4,338 | Great Britain | of 1906 |